United States Patent

[11] 3,597,776

[72] Inventor Crawford B. Saunders
RR5, Box 5459, Albuquerque, N. Mex. 87112
[21] Appl. No. 813,051
[22] Filed Apr. 3, 1969
[45] Patented Aug. 10, 1971

[54] TOOL FOR CUTTING, JOINING AND DISCONNECTING BELL AND SPIGOT PIPES
20 Claims, 13 Drawing Figs.

[52] U.S. Cl. .................................................. 7/14.1, 29/237, 81/68
[51] Int. Cl. ................................................... B25f 1/00, B23p 19/04
[50] Field of Search ....................................... 7/14.1; 29/237; 81/68

[56] References Cited
UNITED STATES PATENTS
3,270,406 9/1966 Gorman et al. ............ 29/237

Primary Examiner—Travis S. McGehee
Attorney—Baldwin, Wight and Brown

ABSTRACT: This disclosure is directed to a tool for assembling and disassembling bell and spigot pipes, and includes a pair of clamping members having respective first and second clamping means for clamping securement thereof to a pair of contiguous generally axially aligned pipes, each of the clamping members including a housing, an apertured member fixed to one of the housings and slidably received in an aperture bore of the other of the housings whereby a tool selectively positioned within the apertures may be manipulated to impart relative movement of the clamping members toward and away from each other for respectively assembling and disassembling the pipes, one of the clamping members having a tubular handle, and pipe cutting means in the form of a flexible member carrying a plurality of cutting elements being retractably supported interiorly of the tubular handle.

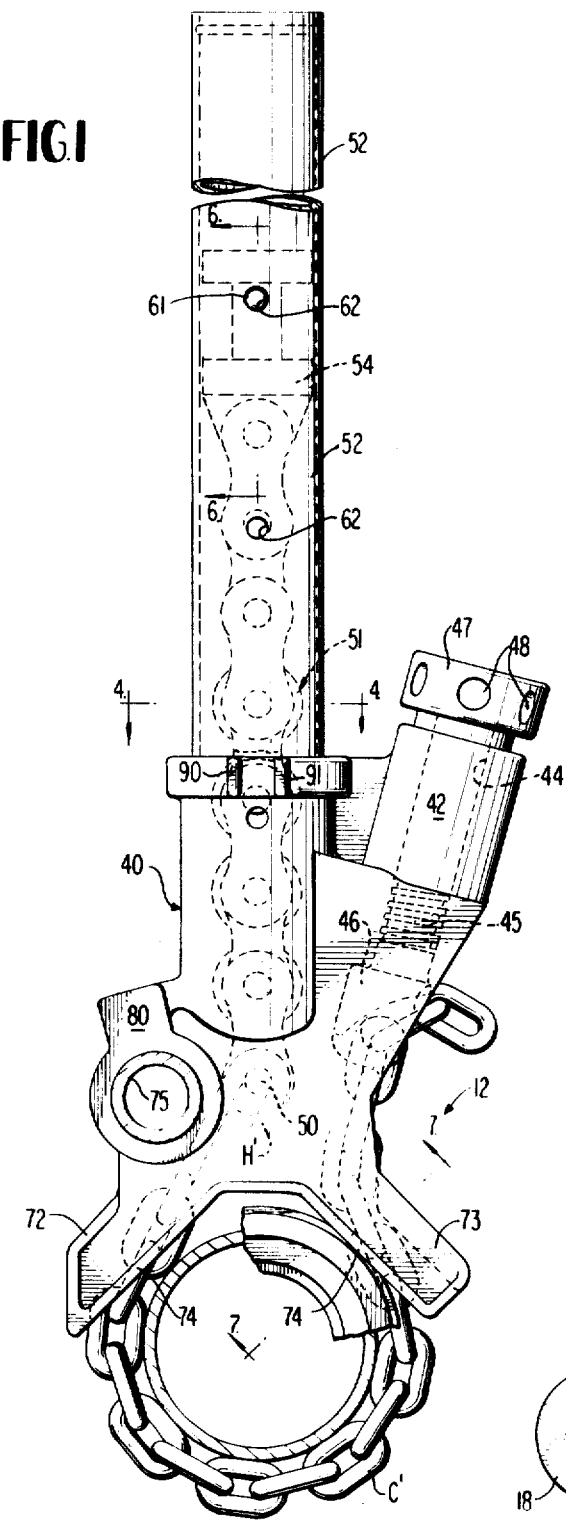

Patented Aug. 10, 1971
3,597,776
4 Sheets-Sheet 2
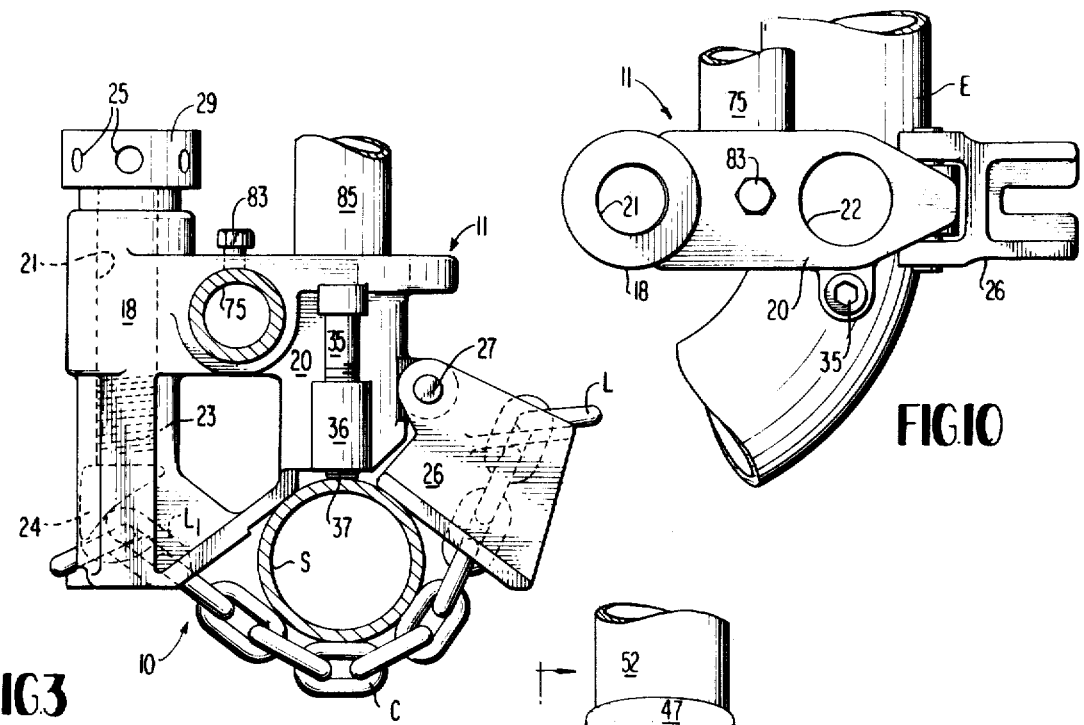
FIG.3
FIG.10
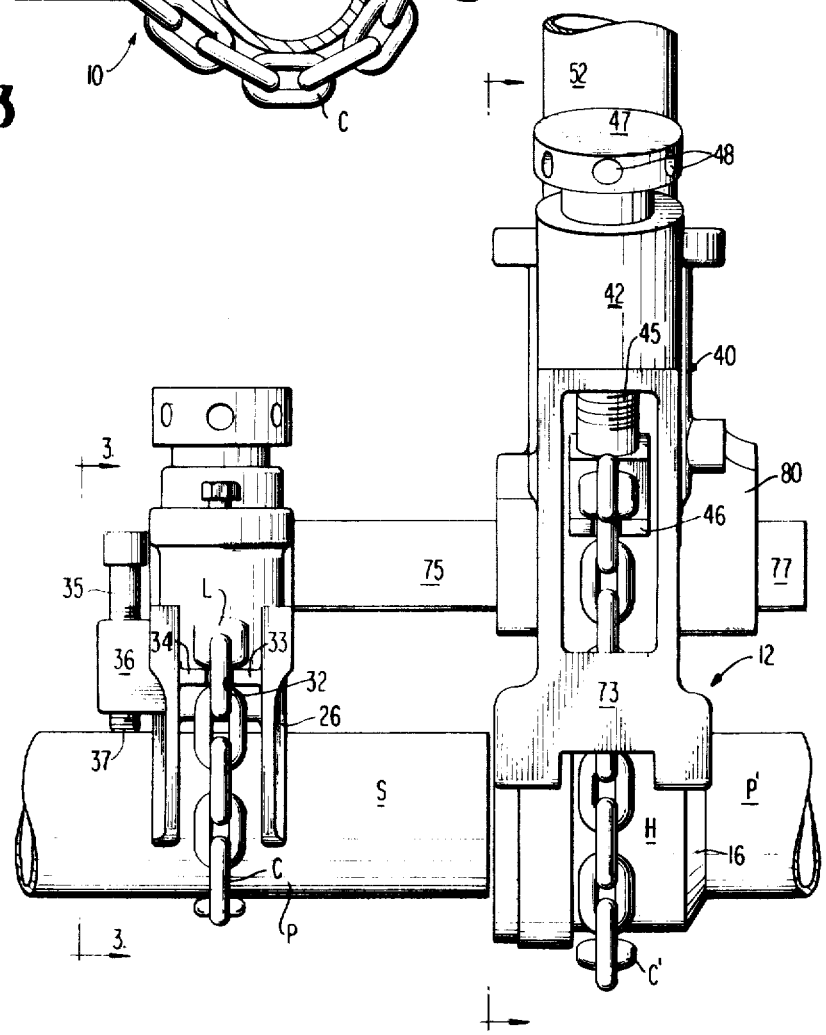
FIG.2

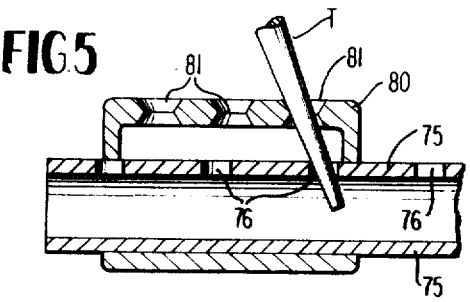
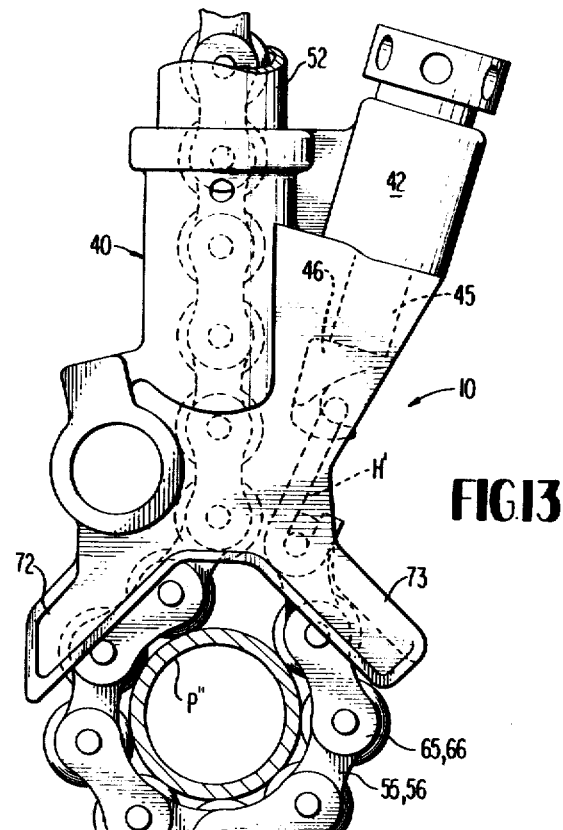
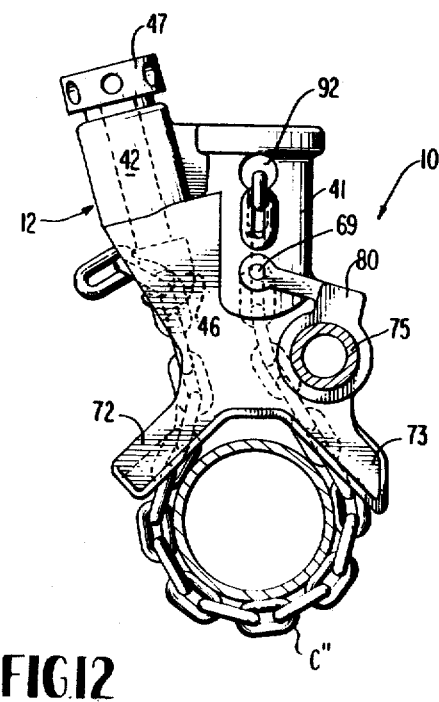
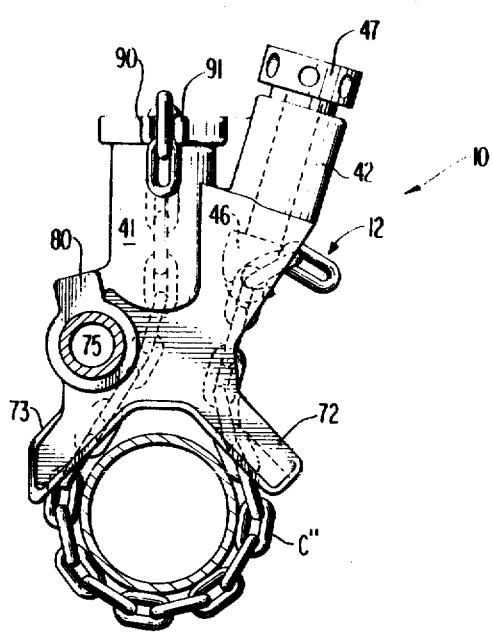

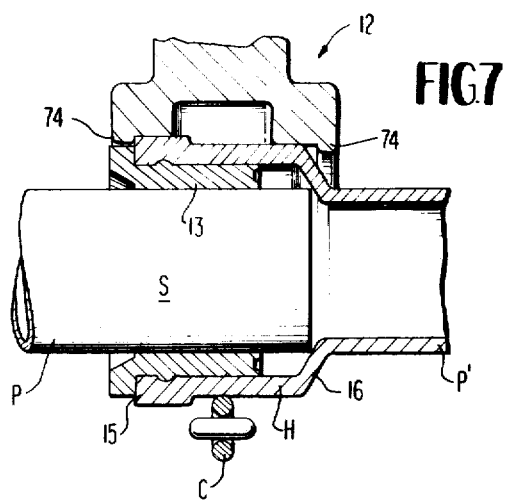
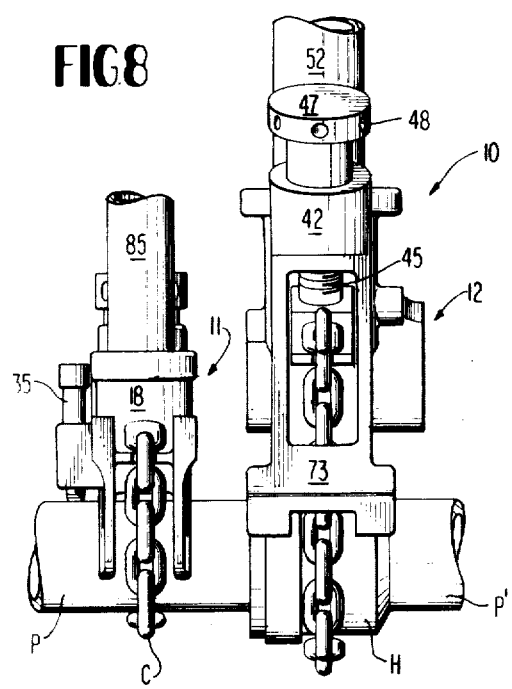
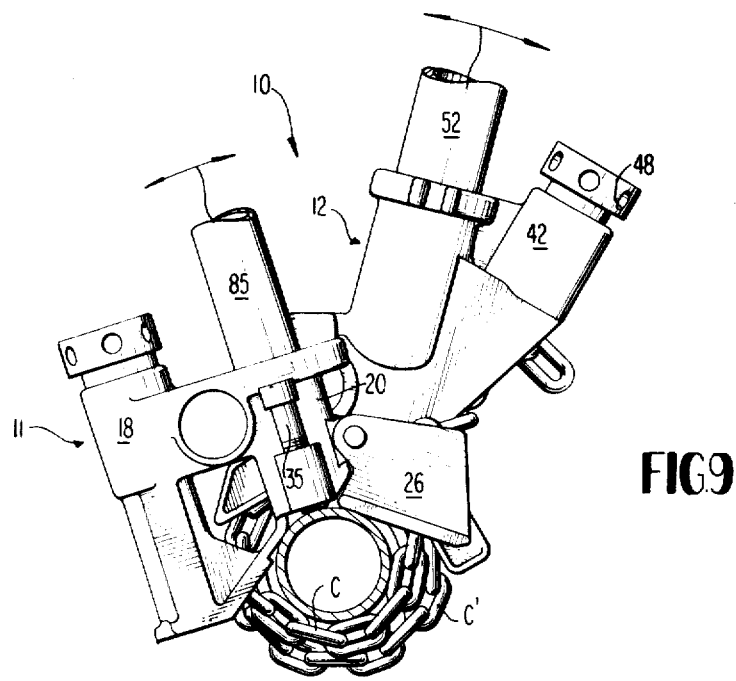

TOOL FOR CUTTING, JOINING AND DISCONNECTING BELL AND SPIGOT PIPES

Conventional tools for assembling and disassembling bell and spigot pipes are relatively well known but for the most part each includes one or more disadvantages as, for example, excessive weight and cost, inability of satisfactorily operating under all conditions and particularly in cramped quarters, difficulties in attachment and detachment, and the tendency to become jammed because of dirt or similar environmental contaminants. In addition, many such conventional tools include clamping heads which must be reversed and/or readjusted during and/or between pipe assembling and disassembling operations.

In keeping with the foregoing it is a primary object of this invention to provide a novel tool for assembling and disassembling bell and spigot pipes which is relatively inexpensive, lightweight, has a few moving parts susceptible to jamming, need not be reversed during and/or between assembling and disassembling operations, needs no special tools during the operation thereof, and additionally provides a variety of modes of operation to effectively operate in tight locations upon elbow, T, straight and similar standard pipes.

A further object of this invention is to provide a novel tool for assembling and disassembling bell and spigot pipes which includes a pair of clamping members having clamping means for clamping securement thereof to a pair of contiguous generally axially aligned pipes, the clamping members including housings having aligned bores within which is received an apertured tubular member, the tubular member being fixedly secured to one of the housings, and the other of the housings having a plurality of apertures in alignment with the apertures of the tubular member whereby a punch or similar tool can be inserted into selected ones of the apertures to apply relative movement to the clamping members and the pipes secured thereto toward or away from each other during respective assembling and disassembling operations.

A further object of this invention is to provide a novel tool of the type heretofore described wherein either or both clamping means includes a screw threadably secured to a threaded bore of the associated housing, the screw having an exterior head provided with apertures to receive the punch for employing rotation to the screw, and a hook carried by an opposite end of the screw to which is attached one end of a chain which partially bounds the associated pipe whereby rotation of the screw selectively increases or decreases the clamping forces.

Still another object of this invention is to provide a novel tool of the type heretofore set forth wherein one of the clamping members includes a tubular handle, and cutting means in the form of a flexible member carrying a plurality of cutting elements is retractably supported within the handle.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a fragmentary side elevational view of the novel tool of this invention, and illustrates one of a pair of clamping members secured to a pipe by means of a chain which is tightened by a screw threaded within a bore of a housing, and a flexible pipe cutting member supported within a tubular handle.

FIG. 2 is a fragmentary elevational view of the tool looking from left to right in FIG. 1, and illustrates the second of the clamping members and a screw carried thereby for aligning the pair of pipes.

FIG. 3 is a sectional view taken generally along line 3-3 of FIG. 2, and illustrates a clamping chain coupled between a screw and a pivotal clamping jaw for applying the clamping force to the associated pipe.

FIG. 4 appearing on the sheet of drawing containing FIG. 1 is a fragmentary sectional view taken generally along line 4-4 of FIG. 1 and rotated 180° with elements removed for clarity, and illustrates an apertured tubular member connected between the clamping members and a plurality of apertures in a housing of the bell or hub clamping member for receiving a punch to move the clamping members toward or away from each other during respective assembling and disassembling operations.

FIG. 5 is a fragmentary sectional view taken generally along line 5-5 of FIG. 4, and illustrates the manner in which a punch is inserted into the apertures for imparting relative movement to the clamping members.

FIG. 6 appearing on the sheet containing FIG. 1 is an enlarged fragmentary sectional view taken generally along line 6-6 of FIG. 1, and illustrates the manner in which the flexible pipe cutting member is retractably supported within the tubular handle.

FIG. 7 is a fragmentary sectional view taken generally along line 7-7 of FIG. 1, and illustrates the manner in which the bell or hub clamping member is provided with radially inwardly directed flanges to prevent slippage of the clamping member relative to the bell of the pipe.

FIG. 8 is a fragmentary side elevational view similar to FIG. 2, and illustrates the apertured tubular member being removed to permit relative rotation of the clamping members to "break" the joint of the pipes prior to the disassembly thereof.

FIG. 9 is an elevational view looking from left-to-right in FIG. 8, and illustrates the manner in which the clamping members are pivoted relative to each other to break the connection between the pipes.

FIG. 10 which appears on the sheet of drawing containing FIG. 3 is a fragmentary top plan view of the spigot clamping member with parts removed for clarity, and illustrates the manner in which the spigot clamping member can be secured to a pipe elbow.

FIG. 11 is a sectional view similar to FIG. 1, and illustrates the manner in which the handle has been removed and the clamping chain secured between a pair of notches carried by the housing.

FIG. 12 is a side elevational view of the opposite side of the clamping member shown in FIG. 11, and illustrates the manner in which the clamping chain is secured to a keyhole slot of the housing.

FIG. 13 is a fragmentary side elevational view similar to FIG. 1, and illustrates the manner in which a portion of the pipe cutting mechanism is clamped in surrounding relationship to a pipe.

A novel tool for assembling and disassembling pipes in accordance with this invention is best illustrated in FIGS. 1 through 4 of the drawings, and is generally designated by the reference numeral 10. The tool 10 includes a pair of clamping members 11 and 12 which are adapted to be respectively clampingly secured to a spigot S of a first pipe P and a bell or hub H of a second pipe P'. The pipes P, P' are of a conventional construction, and when in assembled relationship (FIG. 7) a seal 13 is preferably positioned between the hub H and the spigot S as shown in FIG. 7 to prevent leakage. Though the seal 13 has a radially outwardly directed flange 14 which partially overlies a face 15 of the hub H, the seal 13 may be of any other conventional construction and forms no part of this invention. In addition to the face 15 of the hub H, the pipe P' also includes an annular shoulder 16.

The spigot clamping member 11 includes a housing 17 which is preferably constructed from steel or similar metallic material, and includes a pair of tubular portions 18, 20 (FIGS. 3 and 4) which include respective bores 21, 22. The bore 22 is perfectly cylindrical and smooth while the bore 21 is threaded to receive a screw 23 carrying a hook 24 at its lower end. The hook 24 is preferably swivelly connected to the screw 23 in order that upon rotation of the screw 23 the hook 24 will remain relatively stationary. An upper end portion of the screw 23 is provided with an enlarged head 29 having a plurality of radial openings 25.

A clamping jaw 26 is connected to the housing 17 by means of a pivot pin 27 which passes through a pair of arms 28, 30 of the clamping jaw 26 and an aperture (unnumbered) of a flange 31 of the housing 17. The clamping jaw 26 is slotted as at 32 to provide a pair of shoulders 33, 34 for securing therebetween a link L of a clamping or log chain C, in the manner best illustrated in FIG. 3 of the drawings. Another link L1 of the chain C is received on the hook 24 and a punch or similar tool is inserted in the apertures 25 to rotate the screw 23 in an appropriate direction to tighten the chain C to grip the spigot S in the manner clearly illustrated in FIG. 3 of the drawings. When it is desired to unclamp the spigot S, the screw 23 is rotated in an opposite direction and the chain C is released by removing either or both of the links L, L1 from the respective shoulders 33, 34 and the hook 24.

Leveling means 35 in the form of a screw threadably received in a threaded boss 36 (FIGS. 3 and 4) is carried by the housing 17 rearwardly of the tubular portion 18. A terminal end 37 of the screw 35 bears against an uppermost portion of the spigot S. By rotating the screw 35 the spigot S can be brought into axial alignment with the hub H, as shown in FIG. 2, prior to the operation of the tool 10 to assemble the pipes P, P'.

The hub clamping member 12 likewise includes a housing 40 which is provided with a pair of tubular portions 41, 42, which include respective unthreaded and threaded bores 43, 44. A screw 45 is threadably received in the bore 44 and includes a swivel-mounted hook 46 at one end and an enlarged head 47 at its opposite end having a plurality of radial apertures 48. The purpose of the apertures 48 is to receive a punch or similar tool for rotating the screw 45 to tighten another clamping chain C' surrounding the hub H in the same manner as that heretofore described relative to the operation of the screw 23 of the spigot clamping member 11. However, as opposed to the connection of the link L (FIG. 3) to a clamping jaw as in the case of the spigot clamping member 11, the chain C' includes a hook H' which is secured to a lowermost pin 50 (FIG. 1) of a retractable pipe cutting mechanism 51 which is normally housed entirely within a tubular handle 52 whose lower end portion (unnumbered) is received within the bore 43 of the tubular portion 41.

Reference is now made particularly to FIGS. 1 and 6 which illustrate the manner in which the pipe cutting mechanism 51 is retractably supported within the interior of the tubular handle 52. The cutter mechanism 51 includes an upper terminal end which is connected to a projection 53 of a pluglike member 54 by means of a pair of links 55, 56 and a pin 57 having upset ends (unnumbered). The pluglike member 54 includes a blind bore 58 in which is received a spring 60 and a pin 61. The pin 61 is normally urged radially outwardly of the bore 58 by the spring 60 and is adapted to enter one of a plurality of apertures 62 formed along the length of the handle 52. Convention means are provided for preventing the pin 61 from wholly leaving the bore 58, and the pluglike portion 54 is similarly provided with conventional guide means to maintain the bore 58 in alignment with each of the apertures 62. As an example of the former, the pin 61 could be provided with a longitudinal groove 63 (FIG. 6) into which is received an end of a pin 64 such that the latter limits inward and outward movement of the pin 61 in a conventional manner.

The links 55, 56 are in turn connected to outer links 65, 66 by longer pins 67 having upset heads (unnumbered). The links 65, 66 are likewise connected to innermost links, corresponding to the links 55, 56, and this sequence of connection of various pairs of the links are continued between opposite ends of the pipe cutting mechanism 51.

Approximately three links downward from the pluglike portion 54 a plurality of circular hardened cutting discs 68 are positioned in surrounding relationship to each of the pins 67. A pair of washers 70, 71 are positioned as shown in the lowermost portion of FIG. 6 to permit the cutting discs to freely rotate during a cutting operation, in a manner which will be described more fully hereinafter. However, insofar as the clamping action of the hub clamping member 12 is concerned, it is to be noted that the chain C' is not directly secured to the housing 40 but is instead connected by the hook H' to the pipe cutting mechanism 51 which is in turn fixedly secured to the handle 52 by means of the pin 61 and one of the apertures 62. In order to prevent the handle 52 from being drawn downwardly into the tubular portion 41 beyond a predetermined point, the bore 43 is preferably provided with a radially inwardly directed shoulder (not shown) adjacent its lower end having a diameter less than that of the handle 52 such that a lower terminal face (not shown) of the latter may rest upon the shoulder of the bore 43. A screw 69 threaded radially through the tubular portion 41 (FIG. 12) may be used to clampingly contact the handle 52.

Referring particularly to FIGS. 1 and 7 of the drawings, the housing 40 of the hub clamping member 12 includes a pair of arms 72, 73 which diverge downwardly and away from each other as viewed in FIG. 1. The arms 72, 73 are provided with flanges 74, 74 (FIG. 7) which are in radial overlying relationship to the respective face 15 and the annular shoulder 16 of the hub H in the clamped position of the hub clamping member 12. The flanges 74, 74 thereby function to prevent the clamping member 12 from sliding along and/or off the hub H of the pipe P' during assembly or disassembly thereof relative to the pipe P.

The clamping members 11, 12 of the tool 10 are removably coupled to each other by means of an elongated tubular member 75 (FIGS. 2, 4 and 5) which includes a plurality of aligned apertures 76 in an end portion 77 of the tubular member 75 which is slidably received in a bore 78 of the housing 40. An upper wall 80 which in part defines the bore 78 is provided with a plurality of aligned apertures 81. By positioning a punch, screwdriver or similar tool T (FIG. 5) into selected ones of the apertures 81, 76 and pivoting the same either clockwise or counterclockwise as viewed in FIG. 5 the clamping member 12 can be slid along the elongated member 75 toward or away from the clamping member 11 to which an opposite end 82 of the member 75 is secured by means of a setscrew 83 (FIG. 3) which is received in a threaded bore 84 (FIG. 4) of the housing 17. In lieu of the fixed though removable connection just described, the end portion 82 may be provided with apertures corresponding to the aperture 76 and an eye pin or bolt simply inserted in the apertures 84, 76 to connect the clamping member 11 to the end portion 82 of the tubular member 75.

Assuming it is desired to secure the pipes P, P' to each other in assembled relationship, the clamping members 11, 12 are secured to the spigot S and the hub H in the manner heretofore described and best illustrated in FIG. 2. In this position the spigot S is spaced slightly from the terminal face 15 of the hub H, and the flange 14 of the seal 13. Thereafter the punch is inserted into generally adjacent pairs of the apertures 76, 81 and pivoted to progressively draw the clamping member 11 from left-to-right (FIG. 2) thereby progressively inserting the spigot S into the hub H until the final position shown in FIG. 4 is reached. During the movement of the clamping member 11 toward the clamping member 12, the latter is prevented from moving either left or right as viewed in FIGS. 2 and 7 because of the contact between the flanges 74 and the face 15 and shoulder 16 of the hub H. Likewise, opposite movement imparted to the elongated member 75 will result in the disassembly of the pipes P, P', and during such disassembly the flanges 74 will likewise prevent shifting of the clamping member 12 relative to the pipe P'.

If it is found necessary to break a seal between connected pipes, the setscrew or pin 83 can be removed and the tubular member 75 withdrawn from both of the bores, as shown in FIGS. 8 and 9. A one inch piece of standard pipe 85, functioning as a handle, may then be inserted into the bore 21, and the handles 52, 85 moved in opposite directions to cause relative rotation between the pipes P, P' to break the seal and permit subsequent disassembly thereof in the manner heretofore described.

In lieu of securing the hub clamping member 12 to the pipe P' in the manner heretofore described relative to FIGS. 1 and 2, reference is made to FIGS 11 and 12 which illustrate two different ways of securing the member 12 to the pipe P' by using a shorter length of chain C'', and in the absence of the handle 52 and the cutting mechanism 51 In FIG 11 a link (unnumbered) of the chain C'' is secured to the hook 46 of the screw 45. However, the opposite end of the chain C'' is passed through the bore 43 of the tubular portion 41 and a link thereof is positioned beneath a pair of abutments 90, 91. Upon rotating the head 47 in the manner heretofore described, the link beneath the abutments 90, 91 is drawn into contact with the undersurfaces of the abutments and the chain C'' is thereby prevented from being withdrawn through the bore 43 and is drawn into tight clamping contact with the pipe P'.

In FIG. 12 a link of the chain C'' is likewise secured to the hook 46 of the screw 45, but an opposite end of the chain C'' is engaged within a keyhole slot 92 after having been first positioned internally of the tubular portion 41. Therefore, upon rotating the screw 45 the chain C'' is brought into tight clamping engagement with the pipe P'.

Reference is now made to FIG. 13 of the drawings which illustrates the manner in which the tool 10 is employed to cut a pipe P''. Prior to being assembled upon the pipe P'' as shown in FIG. 13, the pin 61 (FIG. 6) is depressed and a desired length of the cutting mechanism 51 is drawn outwardly with the pin 61 again being repositioned in a lower one of the holes or apertures 62. The chain C' is disengaged from the hook H' and the hook H' is in turn connected between a lowermost of the pins 67 and the hook 46. Thereafter a punch or similar tool is inserted into the apertures 48 to rotate the screw 45 and bring the cutting discs 68 into firm engagement with the exterior surface of the pipe P''. The tool 10 is thereafter rotated about the pipe P'' in a known manner to progressively cut the same, and during the cutting operation the screw 45 is continually tightened to maintain a sufficient force to rapidly complete the cutting operation.

Since the tool 10 is particularly adapted for cutting pipes ranging in outside diameters between 2—6 inches without adapters, the apertures 62 formed in the handle 52 are preferably identified to indicate the length of chain which has been withdrawn from the handle 52. As an example, the lowermost aperture in the handle 52 would be identified with the legend "6 in.," the next uppermost aperture "5 in.," etc. Thus, with the pin 61 positioned in the lowermost aperture an operator would know he had available the proper length of the cutting mechanism 51 to embrace a 6-inch pipe and connect to the hook 46 of the screw 45 when the latter is in its lowermost position. A like correct length of the cutting mechanism 51 would therefore be available for each successive hole entered by the pin 61 between the limits given as an example although larger or smaller diameter pipes can be cut by the tool 10 and the aperture 62 in the handle appropriately identified.

Reference is made to FIG. 10 which illustrates the manner in which the clamping member 11 is coupled to an elbow E, with the clamping member 12 (not shown) located thereabove. It should be particularly noted that the clamping member 11 can be positioned as close as is possible to the curve of the elbow E in the absence of any type of interference, and both assembly and disassembly can be effected by applying the necessary forces to the tubular member 75 through the clamping member 12. In this manner the clamping member 11 is particularly adapted to be connected to the pipe which is most difficult to gain access to while the forces are applied to the more accessible clamping member 12, again in the absence of any type of manipulation or reassembly of the tool.

While preferred forms and arrangements of parts have been shown in illustrating the invention, it is to be clearly understood that various changes in details and arrangement of parts may be made without departing from the spirit and scope of this disclosure

I claim:

1. A tool for assembling and disassembling bell and spigot pipes comprising first and second clamping members each having respective first and second clamping means for clamping securement thereof to a pair of contiguous generally axially aligned pipes, means for guiding said clamping members toward and away from each other to respectively assemble and disassemble said pipes, means for applying a relative force between said clamping members during the guiding thereof, said force applying means being at least in part defined by said guiding means and including an elongated member slidably mounted relative to one of said clamping members and fixedly secured to the other of said clamping members, cooperative means for applying a force to slide said one clamping member relative to said elongated member both toward and away from said other clamping member to respectively assemble and disassemble said pipes, said one clamping member includes a housing having a bore in which is slidably received said elongated member, and said cooperative means are defined by aperture means in said housing opening into said bore and in alignment with aperture means in said elongated member whereby a tool can be positioned into selected pairs of said aperture means and a force applied thereto for sliding said one clamping member relative to said elongated member.

2. A tool for assembling and disassembling bell and spigot pipes comprising first and second clamping members each having respective first and second clamping means for clamping securement thereof to a pair of contiguous generally axially aligned pipes, means for guiding said clamping members toward and away from each other to respectively assemble and disassemble said pipes, means for applying a relative force between said clamping members during the guiding thereof, said force applying means being at least in part defined by said guiding means and including an elongated member slidably mounted relative to one of said clamping members and fixedly secured to the other of said clamping members, cooperative means for applying a force to slide said one clamping member relative to said elongated member both toward and away from said other clamping member to respectively assemble and disassemble said pipes, and means carried by at least one of said clamping members for adjusting the alignment of a pipe clamped thereto with a pipe clamped to said other clamping member.

3. A tool for assembling and disassembling bell and spigot pipes comprising first and second clamping members each having respective first and second clamping means for clamping securement thereof to a pair of contiguous generally axially aligned pipes, means for guiding said clamping members toward and away from each other to respectively assemble and disassemble said pipes, means for applying a relative force between said clamping members during the guiding thereof, said force applying means being at least in part defined by said guiding means and including an elongated member slidably mounted relative to one of said clamping members and fixedly secured to the other of said clamping members, cooperative means for applying a force to slide said one clamping member relative to said elongated member both toward and away from said other clamping member to respectively assemble and disassemble said pipes, said first clamping member includes a housing, a bore in said housing, said first clamping means includes a screw threadably secured to a thread of said bore, an end of said screw opposite said head having hook means for connecting said screw to a chain link of a clamping chain whereby selective rotation imparted to said screw through the head thereof is effective to selectively loosen and tighten said first clamping means, a movable clamping jaw carried by said housing, and means for securing another link of said clamping chain to said clamping jaw.

4. A tool for assembling and disassembling bell and spigot pipes comprising first and second clamping members each having respective first and second clamping means for clamping securement thereof to a pair of contiguous generally axially aligned pipes, means for guiding said clamping members toward and away from each other to respectively assemble and disassemble said pipes, means for applying a relative force between said clamping members during the guiding thereof, said force applying means being at least in part defined by said guiding means and including an elongated member slidably mounted relative to one of said clamping members and fixedly secured to the other of said clamping members, cooperative means for applying a force to slide said one clamping member relative to said elongated member both toward and away from said other clamping member to respectively assemble and disassemble said pipes, wherein said first clamping member includes a housing, a bore in said housing, said first clamping means includes a screw threadably secured to a thread of said bore, an end of said screw opposite said head having hook means for connecting said screw to a chain link of a clamping chain whereby selective rotation imparted to said screw through the head thereof is effective to selectively loosen and tighten said first clamping means, a clamping jaw pivotally carried by said housing, and means for securing another link of said clamping chain to said clamping jaw.

5. The tool as defined in claim 1 wherein said first clamping member includes another bore in said housing, said first clamping means includes a screw threadably secured to a thread of said another bore, said screw having an exterior head provided with aperture means to receive a tool for rotating said screw, and an end of said screw opposite said head having hook means for connecting said screw to a chain link of a clamping chain whereby rotation imparted to said screw through the head thereof is effective to selectively loosen and tighten said first clamping means.

6. The tool as defined in claim 5 including a clamping jaw pivotally carried by said housing, and means for securing another link of said clamping chain to said clamping jaw.

7. The tool as defined in claim 1 wherein said other clamping member includes a housing having a threaded bore, said second clamping means includes a screw threadably secured to said last-mentioned bore, said screw having an exterior head provided with aperture means to receive a tool for rotating said screw, and an end of said screw opposite said head having hook means for connecting said screw to a chain link of a clamping chain whereby relative rotation imparted to said screw through the head thereof is effective to selectively loosen and tighten said second clamping means.

8. The tool as defined in claim 1 wherein said other clamping member includes a housing having a threaded bore, said second clamping means includes a screw threadably secured to said last-mentioned bore, said screw having an exterior head provided with aperture means to receive a tool for rotating said screw, an end of said screw opposite said head having hook means for connecting said screw to a chain link of a clamping chain whereby relative rotation imparted to said screw through the head thereof is effective to selectively loosen and tighten said second clamping means, said housing having a further bore adapted to receive a handle, and said further bore including slot means for securing another link of said clamping chain thereto.

9. The tool as defined in claim 1 wherein said other clamping member includes a housing having a threaded bore, said second clamping means includes a screw threadably secured to said last-mentioned bore, said screw having an exterior head provided with aperture means to receive a tool for rotating said screw, an end of said screw opposite said head having hook means for connecting said screw to a chain link of a clamping chain whereby relative rotation imparted to said screw through the head thereof is effective to selectively loosen and tighten said second clamping means, said housing having a tubular handle, and means connecting said chain to said handle.

10. The tool as defined in claim 9 wherein said connecting means includes pipe cutting means housed within said handle.

11. The tool as defined in claim 9 wherein said connecting means includes pipe cutting means housed within said handle, one clamping member includes a tubular last-mentioned handle, and pipe cutting means housed within said handle.

12. The tool as defined in claim 11 wherein said pipe cutting means is a flexible member carrying a plurality of cutting elements.

13. The tool as defined in claim 11 including means for retractably supporting said cutting means within said handle.

14. The tool as defined in claim 12 including means for retractably supporting said flexible member within said handle.

15. The tool as defined in claim 14 including means for selectively adjusting said supporting means to expose predetermined lengths of said flexible member outwardly of said housing.

16. The tool as defined in claim 15 wherein said adjusting means includes pin means carried by said flexible member for selective engagement in any one of a plurality of apertures in said handle.

17. A tool for assembling and disassembling bell and spigot pipes comprising first and second clamping members each having respective first and second clamping means for clamping securement thereof to a pair of contiguous generally axially aligned pipes, means for guiding said clamping members toward and away from each other to respectively assemble and disassemble said pipes, means for applying a relative force between said clamping members during the guiding thereof, said force applying means being at least in part defined by said guiding means and including an elongated member slidably mounted relative to one of said clamping members and fixedly secured to the other of said clamping members, cooperative means for applying a force to slide said one clamping member relative to said elongated member both toward and away from said other clamping member to respectively assemble and disassemble said pipes, one of said first and second clamping members including a housing, a bore in said housing, said one clamping member including a screw threadably secured to a thread of said bore, and an end of said screw opposite said head having hook means for releasably connecting said screw to a chain link of a clamping chain whereby selective rotation imparted to said screw through the head thereof is effective to selectively loosen and tighten said first clamping means.

18. The tool as defined in claim 17 including means carried by at least one of said first and second clamping members for adjusting the alignment of a pipe clamped thereto with a pipe clamped to the remainder of said first and second clamping members.

19. The tool as defined in claim 17 wherein said housing of said one clamping member includes additional means for releasably connecting another chain link of the clamping chain thereto.

20. The tool as defined in claim 19 including means carried by at least one of said clamping members for adjusting the alignment of a pipe clamped thereto relative to a pipe clamped to the remaining clamping member.